(12) United States Patent
Tsuchida et al.

(10) Patent No.: US 7,204,758 B2
(45) Date of Patent: Apr. 17, 2007

(54) VIDEO GAME APPARATUS AND CONTROL METHOD THEREOF, AND PROGRAM OF VIDEO GAME AND COMPUTER-READABLE RECORDING MEDIUM HAVING PROGRAM RECORDED THEREON

(75) Inventors: Toshiro Tsuchida, Tokyo (JP); Takatsugu Nakazawa, Tokyo (JP)

(73) Assignee: Square Enix Co., Ltd., Tokyo (JP)

( * ) Notice: Subject to any disclaimer, the term of this patent is extended or adjusted under 35 U.S.C. 154(b) by 905 days.

(21) Appl. No.: 09/986,586

(22) Filed: Nov. 9, 2001

(65) Prior Publication Data

US 2002/0142848 A1 Oct. 3, 2002

(30) Foreign Application Priority Data

Mar. 29, 2001 (JP) ............... 2001-097576

(51) Int. Cl.
*A63F 13/00* (2006.01)
(52) U.S. Cl. ............... 463/43; 463/42; 463/1; 463/23
(58) Field of Classification Search ........... 463/1, 463/7–8, 11, 30–33, 36, 40–43, 47.1, 47.2, 463/23
See application file for complete search history.

(56) References Cited

U.S. PATENT DOCUMENTS

| 6,261,179 B1 * | 7/2001 | Miyamoto et al. ............ 463/23 |
| 6,347,993 B1 * | 2/2002 | Kondo et al. .................. 463/1 |
| 6,358,148 B1 * | 3/2002 | Tanaka ......................... 463/23 |
| 6,375,571 B1 * | 4/2002 | Ohnuma et al. .............. 463/37 |
| 6,533,663 B1 * | 3/2003 | Iwao et al. ................... 463/32 |
| 6,623,358 B2 * | 9/2003 | Harima ......................... 463/31 |

FOREIGN PATENT DOCUMENTS

| JP | 8-155145 | 6/1996 |
| JP | 11244533 | 9/1999 |
| JP | 2000-37558 | 2/2000 |
| JP | 2001232056 | 8/2001 |

OTHER PUBLICATIONS

SquareSoft: Final Fantasy VIII Instruction Manual & Mini Walkthrough, 2000, Square Electronic Arts.*
English Language Abstract and English language translation of paragraphs [0066]-[0076] of JP 2000-37558.
English Language Abstract of JP 8-155145.
English Language Abstract of JP 11-244533.
English Language Abstract of JP 2001-232056.

* cited by examiner

*Primary Examiner*—Xuan Thai
*Assistant Examiner*—Alex Epshteyn
(74) *Attorney, Agent, or Firm*—Greenblum & Bernstein, P.L.C.

(57) ABSTRACT

A video game determines a reward acquired by a player character that has won a battle. If the player character inflicts damage of at least a predetermined value on an enemy character and kills the enemy character, the experience points acquired by the player character increase and the number of acquired items is also increased. If damage inflicted by the player character on the enemy character, immediately before the player character defeats the enemy character, is at least the predetermined value, then the reward of the battle is thus modified favorably for the player.

18 Claims, 6 Drawing Sheets

VIDEO GAME APPARATUS AND CONTROL METHOD THEREOF, AND PROGRAM OF VIDEO GAME AND COMPUTER-READABLE RECORDING MEDIUM HAVING PROGRAM RECORDED THEREON

CROSS-REFERENCES TO RELATED APPLICATION

The present disclosure relates to subject matter contained in Japanese Patent Application No. 2001-097576 filed on Mar. 29, 2001.

BACKGROUND OF THE INVENTION

1. Field of the Invention

The present invention relates to video games. In particular, the present invention relates to a technique for determining a reward acquired by a player character by winning a battle.

2. Description of the Related Art

In a video games such as an RPG (Role Playing Game), in many cases, a player advances the games by operating a character and fighting a battle with an enemy character. The player character typically acquires a reward, such as experience points or a trophy, by winning the battle.

The reward acquired by the player character as a result of the battle is a great pleasure in playing the game. Therefore, how the reward is determined is an important matter that influences the interest of the game.

SUMMARY OF THE INVENTION

An object of the present invention is to provide a video game that adopts a novel procedure for determining a reward acquired by a player character who won a battle, thereby increasing the pleasure of the game.

In accordance with a first aspect of the present invention, there is implemented such a video game that at least one predetermined parameter of a player character is changed when the player character fights a battle with an enemy character and wins the battle. Upon executing a program of the video game, the computer compares the damage inflicted on the enemy character by the player character immediately before the player character defeats the enemy character with a threshold previously set for the enemy character. Here, the damage means damage points assigned to each attack for representing the effectiveness of the attack. The parameter stored in a storage device is changed in accordance with different conditions between the case in which the damage is less than the threshold and the case in which the damage is at least the threshold. Such a parameter is, for example, a growth parameter indicating the degree of growth of the player character.

In accordance with a second aspect of the present invention, there is implemented such a video game that a predetermined parameter of a player character is raised provided that the player character fights a battle with an enemy character and wins the battle. Upon executing a program of the video game, the computer compares damage inflicted on the enemy character by the player character immediately before the player character defeats the enemy character with a threshold previously set for the enemy character. If the damage is less than the threshold, then the computer raises the parameter stored in a storage device by a first value. On the other hand, if the damage is at least the threshold, then the computer raises the parameter stored in the storage device by a second value that is greater than the first value. Such parameter is, for example, a growth parameter indicating the degree of growth of the player character. In the case where the damage is at least the threshold, the parameter may be always raised by a quantity that is greater as compared with when the damage is less than the threshold. In other words, the first value may be always greater than the second value. Alternatively, whether the parameter is increased by a larger quantity compared to the quantity increased in the case where the damage is less than the threshold may be determined in accordance with a predetermined probability.

In accordance with a third aspect of the present invention, there is implemented such a video game that a player character can acquire an item provided that the player character fights a battle with an enemy character and wins the battle. Upon executing a program of the video game, the computer compares the damage inflicted on the enemy character by the player character immediately before the player character wins against the enemy character with a threshold previously set for the enemy character. If the damage is less than the threshold, then the computer increases the number of items stored in a storage device by a first number. On the other hand, if the damage is at least the threshold, then the computer increases the number of items stored in the storage device by a second number that is greater than the first number. In the case where the damage is at least the threshold, the number of items may be always increased by the greater number than the number increased in the case where the damage is less than the threshold. Alternatively, whether the number of items is increased by the greater number compared to the number increased in the case where the damage is less than the threshold may be determined in accordance with a predetermined probability.

In accordance with a fourth aspect of the present invention, there is implemented such a video game that a player character can acquire an item provided that the player character fights a battle with an enemy character and wins the battle. Upon executing a program of the video game, the computer compares damage inflicted on the enemy character by the player character immediately before the player character defeats the enemy character with a threshold previously set for the enemy character. If the damage is less than the threshold, then the computer increases the number of a first item stored in a storage device. On the other hand, if the damage is at least the threshold, then the computer increases the number of a second item stored in the storage device. At least with a predetermined probability, the first item is made different from the second item. In other words, in the case where the damage is at least the threshold, the number of the items that is always different from the items increased in number in the case where the damage is less than the threshold may be increased. Alternatively, in the case where the damage is at least the threshold, whether the number of the items different from the items in the case where the damage is less than the threshold is increased may be determined with a predetermined probability.

It is desirable that the second item is more favorable for the player than the first item. For example, the first item may be a medicine item having a small hit point recovery quantity, whereas the second item may be a medicine item having a large hit point recovery quantity. In this manner, an item having the same quality as that of the first item, but having an effect higher than that of the first item may be chosen as the second item. Furthermore, an item that is lower in emergence probability than the first item, or an item, that emerges only when the player character inflicts damage of at least the threshold on the enemy character and defeats the enemy character, may be chosen as the second item.

In accordance with a fifth aspect of the present invention, there is implemented such a video game that a player character can acquire an item provided that the player character fights a battle with an enemy character and wins the battle. Upon executing a program of the video game, the computer compares the damage inflicted on the enemy character by the player character immediately before the player character defeats the enemy character with a threshold previously set for the enemy character. If the damage is less than the threshold, then the computer determines whether the player character acquires the item by using a first item acquisition factor. On the other hand, if the damage is at least the threshold, then the computer determines whether the player character acquires the item by using a second item acquisition factor that is higher than the first item acquisition factor at least with a predetermined probability.

In the case where the damage is at least the threshold, the computer may determine whether the player character acquires the item by using an item acquisition factor that is always higher than that in the case where the damage is less than the threshold. Alternatively, in the case where the damage is at least the threshold, whether an item acquisition factor that is higher than that in the case where the damage is less than the threshold is to be used may be determined with a predetermined probability in determining whether the player character acquires the item.

Thus in the present invention, there is adopted such a novel procedure that a reward acquired by the player character is determined depending on whether the damage inflicted by the player character immediately before the player character defeats the enemy character is at least the threshold. As the reward might differ depending on whether the damage inflicted by the player character immediately before the player character defeats the enemy character exceeds the threshold or not, the pleasure of the battle increases and the interest of the game can be enhanced.

Further objects and advantages of the present invention will be apparent from the following description of the preferred embodiments of the invention as illustrated in the accompanying drawings.

DETAILED DESCRIPTION OF THE PREFERRED EMBODIMENTS

Figure 1:
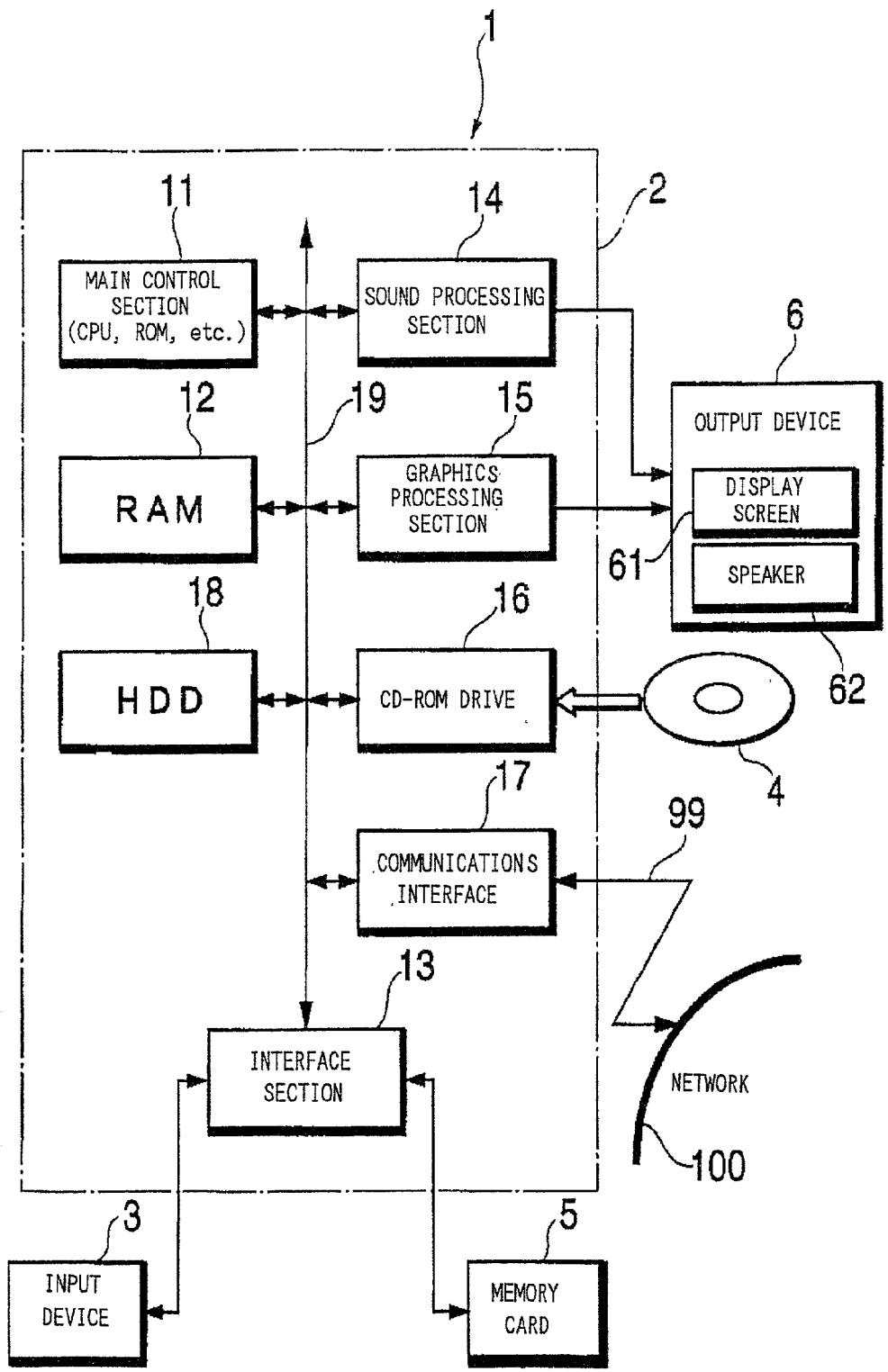
FIG. 1 is a block diagram showing a configuration of a video game apparatus according to an embodiment of the present invention.

FIG. 1 is a block diagram showing a overall configuration of a video game apparatus according to an embodiment of the present invention. A video game apparatus 1 includes, as an example, a control device 2 for controlling the video game apparatus 1, an input device (such as a keypad) 3 connected to the control device 2, and an output device (such as a television set) 6. The game apparatus 1 further includes a memory card 5 for storing game data, such as progress data and configuration data.

The control device 2 is a computer. In the present example, the control device 2 is a game machine for home use. However, the control device 2 is not limited thereto.

As shown in FIG. 1, the control device 2 includes, as an example of the configuration thereof, a main control section 11, a RAM (Random Access Memory) 12, an interface section 13, a sound processing section 14, a graphics processing section 15, a CD-ROM drive 16, a communications interface 17, an HDD (Hard Disk Drive) 18, and a bus 19 for connecting these components to each other. Furthermore, the CD-ROM drive 16 is constituted so that a CD-ROM (Compact Disc Read Only Memory) 4, which is a recording medium having a program, image data and sound data for implementing processing concerning the game described later stored therein, can be mounted thereon so as to be freely attached thereto and detached therefrom.

The main control section 11 is a circuit including a CPU (Central Processing Unit), a ROM (Read Only Memory) and so on. The CPU controls respective components of the control device 2 in accordance with a program stored in the RAM 12 (or in the ROM in some cases). In the ROM, basic programs such as a boot program of the control device 2 and an OS (Operating System) are stored. Furthermore, the main control section 11 includes an oscillator and a timer counter (neither of which is illustrated). The main control section 11 generates a clock signal on the basis of a timing signal output from the oscillator at a predetermined period, counts pulses of the clock signal by using the timer counter, and thereby measures the time.

The RAM 12 is a main storage device used by the CPU of the main control section 11 to execute a program. The program executed by the CPU and data required for the execution are stored in the RAM 12. The RAM 12 is used also as a work area at the time of program execution.

The interface section 13 is constituted so that the input device 3 and the memory card 5 can be connected thereto so as to be freely attached thereto and detached therefrom. The interface section 13 controls data transfer between respective components (mainly the control section 11) connected to the bus 19 and the input device 3 or the memory card 5.

The sound processing section 14 is a circuit for conducting processing to reproduce sound data, such as BGM (Background Music) or sound effects, of a game. The sound processing section 14 generates a sound signal on the basis of data stored in the RAM 12 in accordance with an instruction given by the main control section 11, and supplies the sound signal to the output device 6.

The graphics processing section 15 includes a frame buffer (not illustrated), and draws an image depending upon an instruction given by the main control section 11, on the frame buffer. Furthermore, the graphics processing section 15 adds a predetermined synchronizing signal to image data drawn on the frame buffer, thereby generates a video signal, and supplies the video signal to the output device 6.

The CD-ROM drive 16 is a reading device for reading data stored on the CD-ROM 4 serving as a recording medium. The game apparatus 1 makes the control device 2 execute control according to a game program recorded on the CD-ROM, and thereby implements control concerning the game described later.

The communications interface 17 is a circuit for conducting communications control for conducting various kinds of data exchange with other devices on a network 100. The communications interface 17 is connected to the network 100 via a communications line 99 if necessary. The communications interface 17 controls the delivery and receipt of information (program and data) between the control device 2 and the communications network 100. The game program and data downloaded from the external communications network 100 via the communications interface 17 and the communications line 99 may be stored in the HDD 18.

The HDD 18 is an auxiliary storage device used by the CPU of the main control section 11 to execute a program. Various data and programs, such as information downloaded by using the communications interface 17 and information read from the CD-ROM, may be stored on the HDD 18.

The CD-ROM 4 stores game software. The game software includes necessary data and a game program for making the main control section conduct processing required to execute a computer game. The game program includes a program for making the game apparatus 1 execute a method according to the present embodiment. The game software stored on the CD-ROM 4 can be read by operating the CD-ROM drive 16.

Here, in the game apparatus 1, the game software can be stored on the HDD 18 as well. The game software may be pre-installed on the HDD 18, installed from the CD-ROM 4, or downloaded from other devices on the communications network 100, as described above.

The input device 3 has multiple operation devices operated by a player to input various orders concerning the game to the control device 2. When an operation device is operated, the input device 3 sends a command signal depending upon the operation device to the control device 2 via the interface section 13. In the present embodiment, a keypad 30 typically attached to a home game machine is prepared as the input device 3 as an example.

Figure 2:
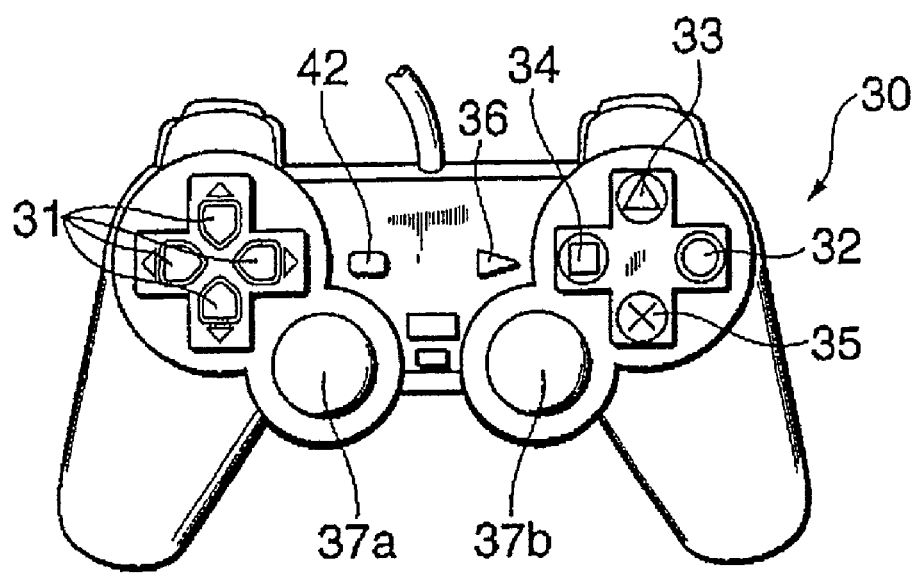
FIG. 2A is a top view showing a keypad.
FIG. 2B is a rear view showing a keypad.
Figure 2:
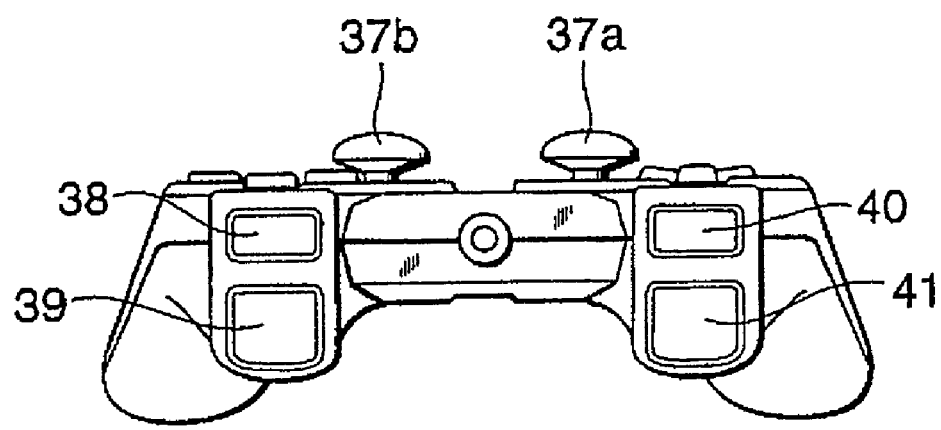

FIG. 2A is a top view showing the keypad 30. FIG. 2B is a rear view showing the keypad 30. As shown in FIG. 2A, cross keys 31 for inputting a direction order, and operation keys (such as, for example, a o button 32, a Δ button 33, a □ button 34, a x button 35, a start button 36, and a select button 42) for inputting various commands to the control device 2 are provided on the keypad 30 as operation devices. Furthermore, joysticks 37a, 37b are also provided on the keypad 30 as operation devices. As shown in FIG. 2B, a plurality of operation keys (an R1 button 38, an R2 button 39, an L1 button 40, and an L2 button 41) are provided on the rear face of the keypad as well as operation devices. In addition, the keypad 30 has a vibration function. In other words, the keypad 30 has a motor incorporated therein. By receiving a predetermined control signal from the control device 2, the motor can be activated to vibrate the keypad 30 as a whole.

The memory card 5 is comprised of a flash memory. The memory card 5 is an auxiliary storage device controlled by the control device 2 to store game data. Writing data into the memory card 5 and reading data from the memory card 5 are controlled by the main control section 11 via the interface section 13.

The output device 6 displays a game image and outputs a sound on the basis of a video signal and a sound signal supplied from the control device 2. In the present embodiment, a television (TV) set is prepared as the output device 6. This television set includes a display screen 61 for image display and a speaker 62 for sound output. The television set displays an image on the display screen 61 in response to a video signal supplied from the graphics processing section 15, and outputs a sound from the speaker 62 in response to a sound signal supplied from the sound processing section 14. Therefore, the television set functions as both a display device and a sound output device.

The main control section 11 controls operation of the control device 2 on the basis of basic software stored in the ROM and the game software read out from the CD-ROM 4 and stored in the RAM 12 by the CD-ROM drive 16. For example, the main control section 11 reads out graphics data from the CD-ROM 4, transfers the graphics data to the graphic processing section 15, and orders the graphics processing section 15 to generate an image. In response to this order, the graphics processing section 15 generates a video signal by utilizing graphics data. This video signal is sent to the output device 6. As a result, an image is displayed on the display screen 61 of the output device 6.

A video game according to the present embodiment is an RPG (Role Playing Game). A player can acquire a reward such as experience points or a trophy (for example, items or virtual money) and make a player character grow by operating the player character and winning a battle against enemy character(s). Parameters, such as experience points, the number of items and amount of the virtual money, assigned to the player character are stored in the RAM 12 during the game play, and stored in the memory card 5 when the game is interrupted.

Figure 3:
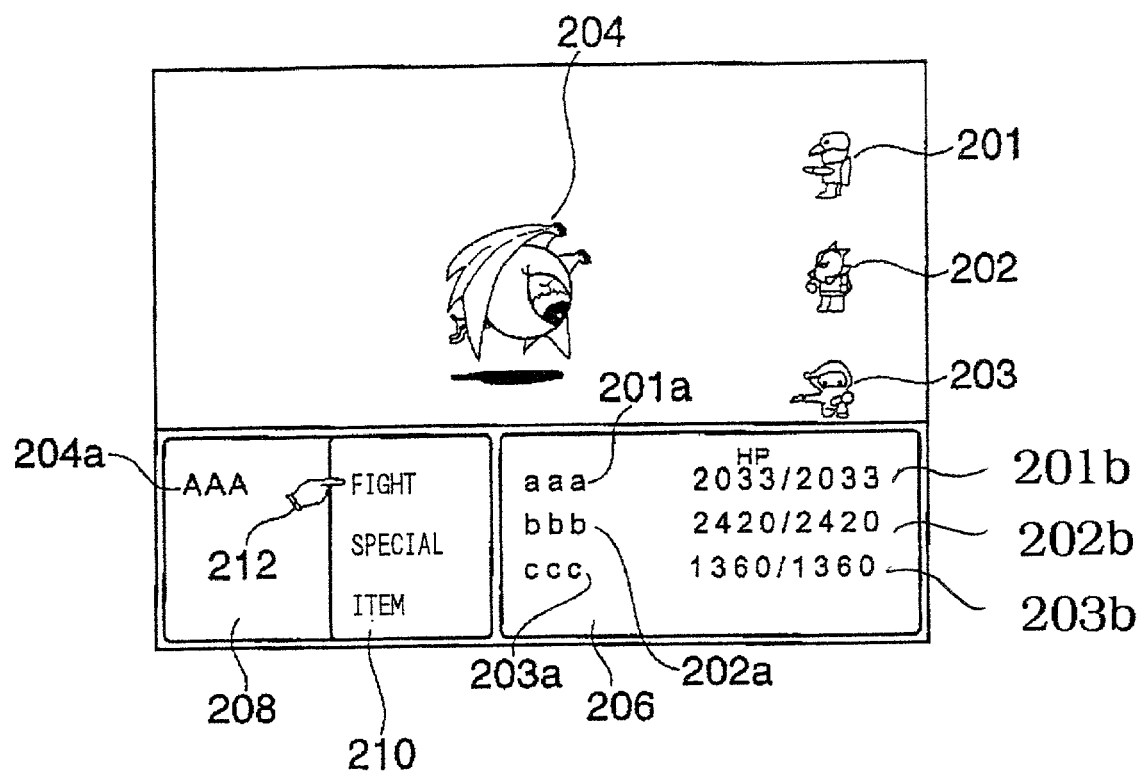
FIG. 3 is a drawing showing an example of an image on a display screen.

If the player character encounters an enemy character, an image of a battle scene is displayed on the screen of the output device 6. FIG. 3 shows an example of the image. In this example, player characters 201 to 203 operated by the player and an enemy character 204 operated by the video game apparatus 1 are displayed on the screen. Names of the player characters 201a to 203a and hit points (HPs) 201b to 203b for each of the player characters 201 to 203 are displayed in a window 206 located at a bottom right portion of the screen. A name 204a of the enemy character 204 is displayed in a window 208 located at a bottom left portion of the screen. A command window 210 and a cursor 212 are displayed between the window 206 and the window 208. Descriptions (such as "fight" and "special") of operation commands (so-called commands) for the characters 201, 202 or 203 that can be selected by the player during the battle are displayed in the command window 210. The cursor 212 can be moved up and down by operating the cross key 31 or the joysticks 37a, 37b of the keypad 30. By aligning the cursor 212 to one of the command descriptions in the window 210, and then depressing the o button 32 of the keypad 30, the player can input an operation command represented by the command description to the video game apparatus 1. The video game apparatus 1 makes the player character 201, 202 or 203 conduct operations according to the input operation command to advance the battle.

Figure 4:
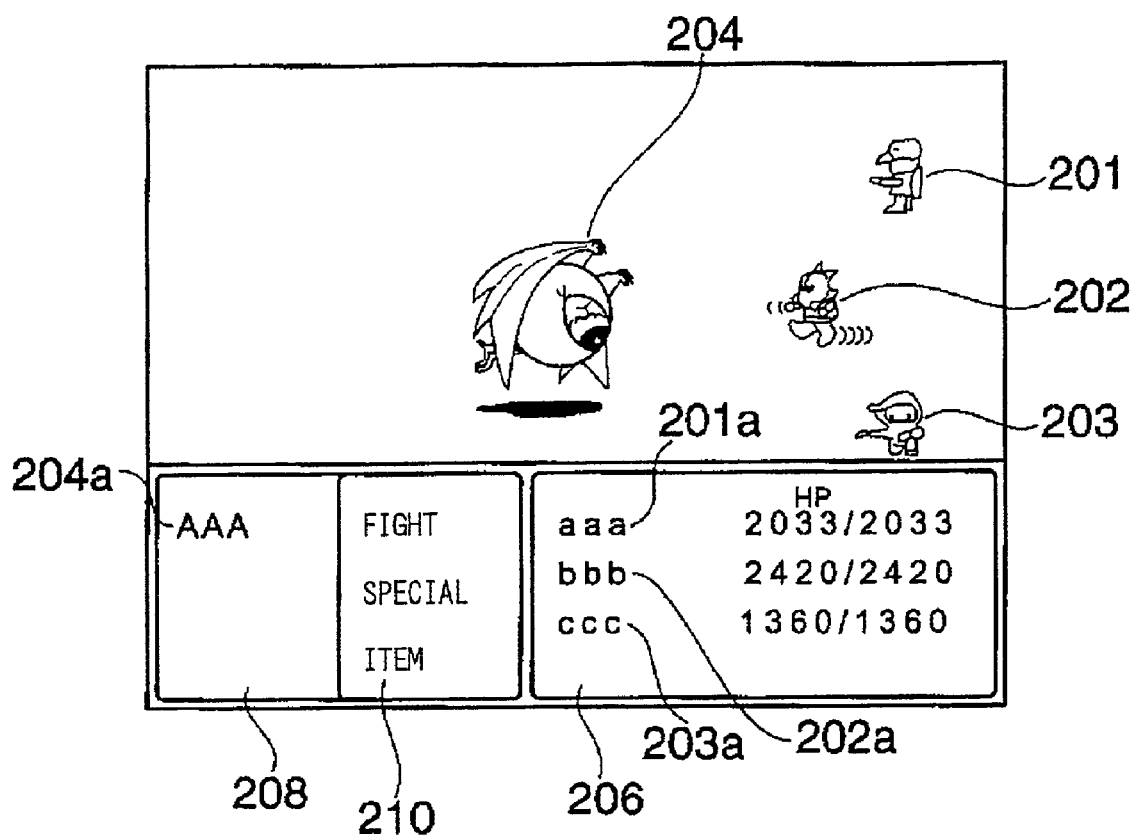
FIG. 4 is a drawing showing an example of an image on a display screen.

FIG. 4 shows an example of an image displayed on the screen when the "fight" operation command is input for the player character 202. The player character 202 approaches the enemy character 204 in the screen and conducts an operation attacking the enemy character 204 directly. At this time, a sound effect corresponding to the attack of the player character 202 is reproduced by the output device 6. Thereafter, damage inflicted on the enemy character 204 by the player character 202 is displayed on the screen. The damage is subtracted from the hit points of the enemy character 204. When the hit points of the enemy character 204 decrease to 0 or less as a result of subtraction, it is meant that the player character 202 has defeated the enemy character 204 and won the battle. In this case, the player characters 201 to 203 acquire experience points previously set for the enemy character 204. Furthermore, the hero character 201 primarily operated by the player acquires an item or virtual money previously set for the enemy character 204. This virtual money can be used to sell or buy items or the like in the game.

A characteristic feature of the present embodiment is that, in the case where a player character finally inflicts a great amount of damage on the enemy character and defeats the enemy character, the player is provided with an advantage that the experience points acquired by the player character increase or the number of items acquired by the player character increases. This advantage is given in the case where the damage inflicted by the player character immediately before the player character defeats the enemy character (i.e., the damage finally inflicted on the enemy character) is at least equal to a threshold previously set for the enemy character.

Figure 5:
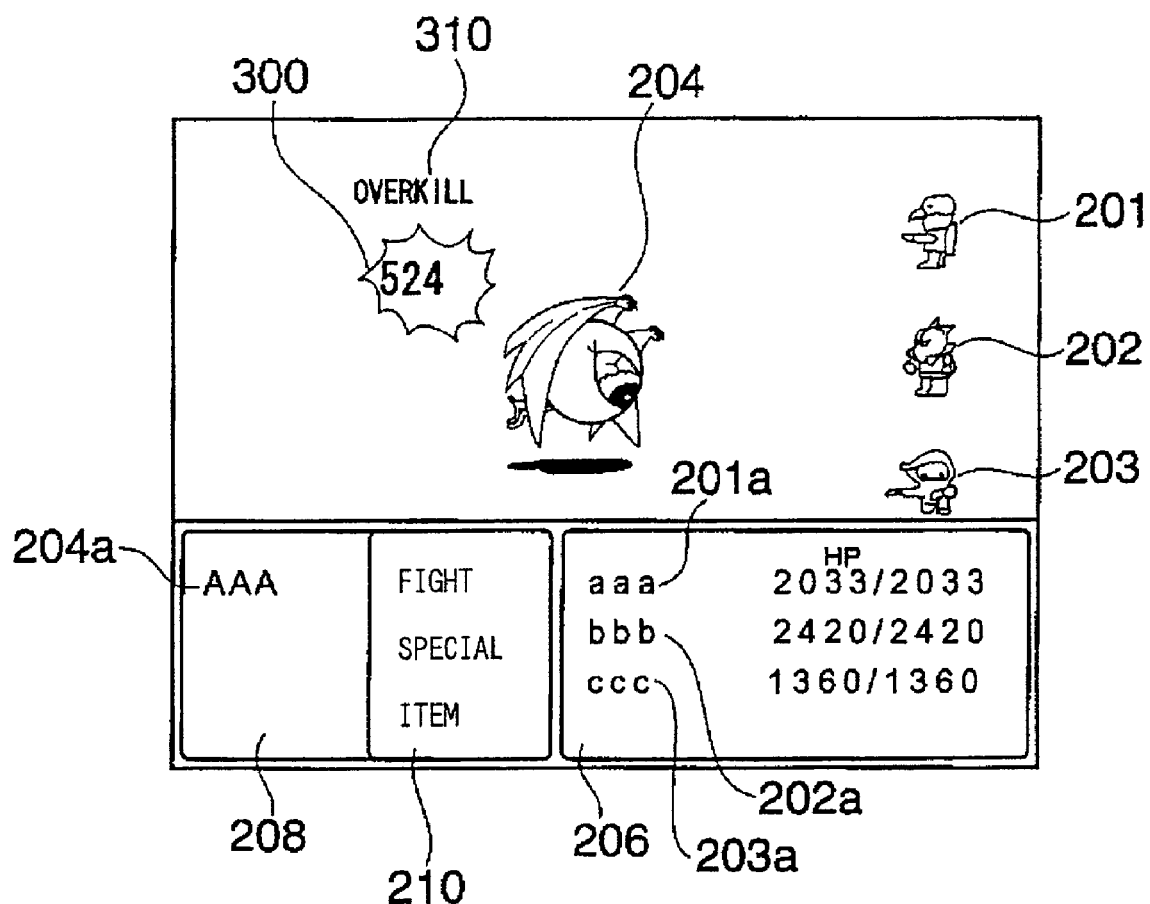
FIG. 5 is a drawing showing an example of an image on a display screen.

FIG. 5 shows an example of an image displayed on the screen when the player character 202 inflicts damage that is at least as great as the previously set threshold on the enemy character 204 and defeats the enemy character 204. An amount of damage inflicted on the enemy character 204 is displayed as denoted with character 300. In addition, characters "OVERKILL" are displayed as denoted with word 310. An amount of damage inflicted on the enemy character by the player character is displayed each time the player character attacks. However, the word "OVERKILL" is displayed only when the player character inflicts an amount of damage that is at least as great as the threshold associated with the enemy character 204 and defeats the enemy character 204.

Figure 6:
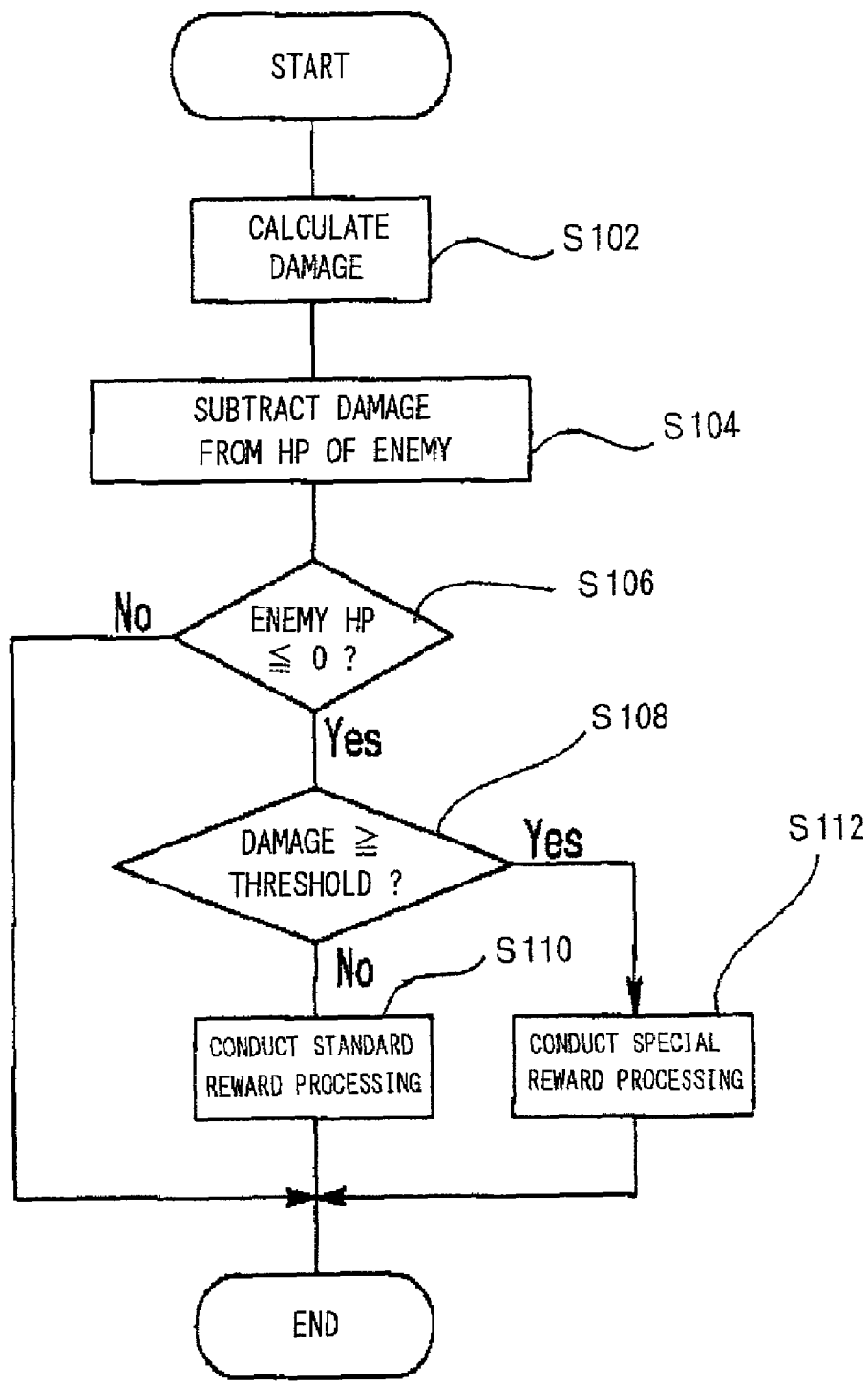
FIG. 6 is a flow chart showing exemplary processing executed by a video game apparatus.

FIG. 6 is a flow chart showing processing executed by the video game apparatus 1 in order to implement the above-mentioned feature. This processing is executed when a player character has attacked the enemy character in response to an operation command by the player. The control device 2 conducts this processing by executing each game program stored on the CD-ROM 4. By the way, game programs and necessary data are read out one after another from the CD-ROM 4 and transferred to the RAM 12 according to the progress state of processing. In the following description, however, detailed description concerning the readout from the CD-ROM 4 and the transfer to the RAM 12 will be omitted in some cases.

If a player character attacks the enemy character in response to an operation command by the player, then damage inflicted on the enemy character by the player character is calculated (step S102). Subsequently, the calculated damage is subtracted from the hit points of the enemy character (step S104). Here, the damage and the hit points are integers. The hit point value of the enemy character is read out from the CD-ROM 4 into the RAM 12 together with other data required to display the battle scene on the screen when displaying the battle scene on the screen. Subsequently, it is determined whether the hit point value of the enemy character is 0 or less (step S106). Thereby, it is determined whether the player character has defeated the enemy character.

If the hit point value of the enemy character obtained by the subtraction of the damage is at least 1 (NO route of the step S106), then the processing is finished and operation processing of another player character or the enemy character is started. On the other hand, if the hit point of the enemy character is 0 or less (YES route of the step S106), then the damage calculated at the step S102 is compared with a threshold previously set for the enemy character (step S108). This threshold is read out from the CD-ROM 4 into the RAM 12 together with other data required to display the battle scene on the screen when displaying the battle scene on the screen.

If the last damage inflicted on the enemy character by the player character is less than the threshold (NO route of the step S108), then standard reward processing is executed (step S110). In this processing, experience points which respective player characters in the party including that player character acquire, and the kind and the number of items which the hero character acquires as a representative of the party are determined according to standard rules. For example, if the player character 202 inflicts damage on the enemy character 204 and defeats the enemy character 204 as shown in FIGS. 3 to 5, then experience points acquired by the player characters 201 to 203, and the kind and the number of items acquired by the hero character 201 are determined according to standard rules. The determined acquisition experience points are added respectively to possessed experience points of the player characters 201 to 203 stored in the RAM 12. Furthermore, the determined acquisition number of the item is added to the possession number of the item of the player character 201 stored in the RAM 12.

On the other hand, if the damage is at least the threshold (YES route of the step S108), then special reward determining processing is executed (step S112). In this processing, the word "OVERKILL" is displayed on a battle picture of the screen. In addition, experience points which respective player characters in the party acquire, and the kind and the number of items which the hero character acquires as a representative of the party are determined according to special rules different from the standard rules. For example, if the player character 202 inflicts damage on the enemy character 204 and defeats the enemy character 204 as shown in FIGS. 3 to 5, then experience points acquired by the player characters 201 to 203, and the kind and the number of items acquired by the hero character 201 are determined according to the special rules. The determined acquisition experience points are added respectively to possession experience points of the player characters 201 to 203 stored in the RAM 12. Furthermore, the determined acquisition number of the item is added to the possessed number of the pertinent item of the player character 201 stored in the RAM 12.

In the present embodiment, two columns for standard rules and special rules are prepared in a table that defines, for respective enemy characters, the experience points and the kinds and the numbers of items a player character acquires when the player character has defeated the enemy characters. According to whether the last damage inflicted on the enemy character is greater than the threshold, either of the two columns is referred to. In the standard reward processing, the column for standard rules is referred to. In the special reward processing, the column for special rules is referred to.

The acquisition experience points of the player character determined by the special rules are greater than the acquisition experience points of the player character determined by the standard rules. Therefore, when a player character has inflicted damage of at least the threshold and defeated the enemy character, the raise quantity of the experience points is greater than when a player character has inflicted damage less than the threshold and defeated the same enemy character. Furthermore, the number of items acquired by the player character determined by special rules is larger than the number of the same items acquired by the player character determined by standard rules. Therefore, when the player character has inflicted damage of at least the threshold on the enemy character and defeated the enemy character, the increase quantity in the number of possession items is larger than when the player character has inflicted damage less than the threshold on the enemy character and defeated the same enemy character.

If the player character inflicts damage of at least the threshold on the enemy character and defeats the enemy character, then an advantage of increased experience points and number of items acquired by the player character is thus given to the player in the present embodiment. Therefore, the pleasure of the battle is increased and the interest of the game can be enhanced.

Thus, the present invention has been described on the basis of one embodiment. However, the present invention is not limited to the above-mentioned embodiment. Without departing from the spirit thereof, various modifications can be made. For example, multiple steps involved in the method according to the present invention can be changed in their order without departing from the spirit or scope of the present invention.

In the above-mentioned embodiment, the raise quantity of the experience points is increased, provided that the player character inflicts damage of at least the threshold on the enemy character and kills the enemy character. Alternatively, the raise quantity of another parameter raised by winning the battle, such as a growth parameter, which indicates the degree of growth of the player character, may be increased.

Although, in the above-mentioned embodiment, the number of items acquired by the player character is increased provided that the player character inflicts damage of at least the threshold on the enemy character and defeats the enemy character, various other advantages concerning items are conceivable. For example, in such a video game that the enemy character does not always have an item but has an item with a predetermined probability, the probability of acquiring an item may be increased, provided that the player character inflicts damage of at least the threshold on the enemy character and kills the enemy character. Furthermore, when the player character inflicts damage of at least the threshold on the enemy character and defeats the enemy character, the player character may acquire an item different from that acquired when the player character inflicts damage less than the threshold on the enemy character and defeats the enemy character, such as a rare item that does not appear usually.

If the player character has inflicted damage of at least the threshold on the enemy character and defeats the enemy character, then the acquisition experience point and the number of acquisition items are always increased in the present embodiment. However, the reward of the player character may be changed with a predetermined probability. For example, the acquisition experience points may be increased at a predetermined probability or the number of acquired items may be increased at a predetermined probability.

The present invention can be applied to such a video game that a player character fights a battle with multiple enemy characters and acquires experience points or items, each time the player character defeats an enemy character. The present invention can also be applied to such a video game that the player character acquires experience points or items only when the player character defeats all enemy characters.

In the above-mentioned embodiment, a single player game that does not use a network has been exemplified. However, a video game implemented by the present invention may be such an on-line game that a group of players operate respective characters in a common virtual space by utilizing a computer network.

In the above-mentioned embodiment, the present invention has been described in connection with a home game apparatus. However, the present invention can be applied to general computers, such as personal computers, or arcade game machines as well.

In the above-mentioned embodiment, the display device, the input device, and the control device are separated from each other. However, it is also possible to apply the present invention to a video game apparatus having the display device, the input device, and the control device united in a single body.

In the above-mentioned embodiment, a CD-ROM is used as a computer-readable recording medium for recording the game program and data. However, the recording medium is not limited to the CD-ROM, but it may be another computer-readable magnetic or optical recording medium or a semiconductor memory, such as a DVD (Digital Versatile Disc) or a ROM card. Furthermore, the program and data for implementing the present invention may be provided by using such a scheme that the program and data are installed previously in a storage device of the game apparatus or a computer.

The program and data for implementing the present invention may be downloaded from other devices located on a network 100, which are connected via a communications line 99, to an HDD 18 by using a communications interface 17 illustrated in FIG. 1. Furthermore, it is also possible to record the program and data previously in a memory of other devices located on the communications line 99, read the program and data one after another in a RAM 12 via the communications line 99 as occasion demands, and use the program and data.

As for the form of providing the program and data for implementing the present invention, the program and data may be provided from other devices located on the network 100 as a computer data signal superimposed on a carrier wave. For example, the control device 2 may request other devices located on the communications network 100 to transmit a computer data signal, from the communications interface 17 via the communications line 99, receive a transmitted computer data signal, and store the computer data signal in the RAM 12, in order to implement the present invention.

According to the present invention, the reward received by a player character might differ depending upon whether the damage inflicted by the player character immediately before the player character wins against an enemy character exceeds a threshold value set for the enemy character previously. As a result, the pleasure of the battle is increased and the interest of games can be increased.

Many widely different embodiments of the present invention may be constructed without departing from the sprit and scope of the present invention. It should be understood that the present invention is not limited to the specific embodiments described in the specification, except as described in the appended claims.

What is claimed is:

1. A computer-readable recording medium having a program of a video game recorded therein, at least one predetermined parameter assigned to a player character in said game being changed when the player character defeats an enemy character, wherein upon being read by a computer, the program of the video game causes the computer to execute:

comparing an amount of damage inflicted on the enemy character by the player character, immediately before the player character defeats the enemy character, with a threshold value previously set for the enemy character;

changing the parameter stored in a storage device according to a first condition, when the enemy is defeated by an amount of damage that is less than the threshold value; and changing the parameter stored in the storage device according to a second condition that is different from the first condition, when the enemy is defeated by an amount of damage that is at least the threshold value.

2. The computer-readable recording medium according to claim 1, wherein when the amount of damage is less than the threshold value, the changing raises the parameter stored in the storage device by a first value; and when the amount of damage is at least the threshold value, the changing raises the parameter stored in the storage device by a second value that is greater than the first value.

3. The computer-readable recording medium according to claim 1, wherein said predetermined parameter comprises the number of items acquired by the player character; and when the amount of damage is less than the threshold value, the changing increases the number of items stored in the storage device by a first number; and when the amount of damage is at least the threshold value, the changing increases the number of items stored in the storage device by a second number that is greater than the first number.

4. The computer-readable recording medium according to claim 1, wherein said predetermined parameter comprises the number of items acquired by the player character;

when the amount of damage is less than the threshold value, the changing increases a number of first items stored in the storage device; and when the amount of damage is at least the threshold value, the changing increases a number of second items that are different from the first items, stored in the storage device.

5. The computer-readable recording medium according to claim 1, wherein when the amount of damage is less than the threshold value, the changing changes the probability of acquiring an item to a first probability; and when the amount of damage is at least the threshold value, the changing changes the probability of acquiring the item to a second probability that is higher than the first probability.

6. The computer-readable recording medium according to claim 1, wherein a plurality of players operate respective characters in a common virtual space by utilizing a computer network.

7. A video game apparatus comprising:

a computer-readable recording medium having a program of a video game recorded therein, at least one predetermined parameter assigned to a player character in said video game being changed when the player character wins a battle against an enemy character; and a computer that reads the program from the recording medium and executes the program by reading the program from the recording medium, wherein upon reading the program from the recording medium, the computer compares an amount of damage inflicted on the enemy character by the player character, immediately before the player character defeats the enemy character, with a threshold value previously set for the enemy character;

changes the parameter stored in a storage device according to a first condition, when the enemy is defeated by an amount of damage that is less than the threshold value; and changes the parameter stored in the storage device according to a second condition that is different from the first condition, when the enemy is defeated by an amount of damage that is at least the threshold value.

8. The video game apparatus according to claim 7, wherein said computer raises the parameter stored in the storage device by a first value, when the amount of damage is less than the threshold value; and raises the parameter stored in the storage device by a second value that is greater than the first value, when the amount of damage is at least the threshold value.

9. The video game apparatus according to claim 7, wherein said predetermined parameter comprises the number of items acquired by the player character; and the computer increases the number of items stored in the storage device by a first number, when the amount of damage is less than the threshold value; and the computer increases the number of items stored in the storage device by a second number that is greater than the first number, when the amount of damage is at least the threshold value.

10. The video game apparatus according to claim 7, wherein said predetermined parameter comprises the number of items acquired by the player character; and the computer increases a number of first items stored in the storage device, when the amount of damage is less than the threshold value; and the computer increases a number of second items, that are different from the first items, stored in the storage device, when the amount of damage is at least the threshold value.

11. The video game apparatus according to claim 7, wherein said predetermined parameter comprises the number of items acquired by the player character; and the computer changes the number of items the player character acquires by using a first item acquisition factor, when the amount of damage is less than the threshold value; and the computer changes the number of the items the player character acquires by using a second item acquisition factor that is higher than the first item acquisition factor, when the amount of damage is at least the threshold value.

12. The video game apparatus according to claim 7, wherein the video game comprises an on-line game in which a plurality of players operate respective characters in a common virtual space by utilizing a computer network.

13. A control method of a video game apparatus including a computer and a display device that displays an image of a video game, at least one predetermined parameter assigned to a player character in said video game being changed when the player character wins a battle against an enemy character, the method comprising:

comparing an amount of damage inflicted on the enemy character by the player character, immediately before the player character defeats the enemy character, with a threshold value previously set for the enemy character;

changing the parameter stored in a storage device according to a first condition, when the enemy is defeated by an amount of damage that is less than the threshold value; and changing the parameter stored in the storage device according to a second condition that is different from the first condition, when the enemy is defeated by an amount of damage that is at least the threshold value.

14. The control method of a video game apparatus according to claim 13, wherein when the amount of damage is less than the threshold value, the changing raises the parameter stored in the storage by a first value; and when the amount of damage is at least the threshold value, the changing raises the parameter stored in the storage device by a second value that is greater than the first value.

15. The control method of a video game apparatus according to claim 13, wherein said predetermined parameter comprises the number of items acquired by the player character; and when the amount of damage is less than the threshold value, the changing increases the number of items stored in the storage device by a first number; and when the amount of damage is at least the threshold value, the changing increases the number of items stored in the storage device by a second number that is greater than the first number.

16. The control method of a video game apparatus according to claim 13, wherein said predetermined parameter comprises the number of items acquired by the player character; and when the amount of damage is less than the threshold value, the changing increases a number of first items stored in the storage device; and when the amount of damages is at least the threshold value, the changing increases a number of second items, that are different from the first items, stored in the storage device.

17. The control method of a video game apparatus according to claim 13, wherein said predetermined parameter comprises the number of items acquired by the player character; and when the amount of damage is less than the threshold value, the changing changes the number of the items the player character acquires by using a first item acquisition factor; and when the amount of damage is at least the threshold value, the changing changes the number of items the player character acquires by using a second item acquisition factor that is higher than the first item acquisition factor.

18. The control method of a video game apparatus according to claim 13, wherein the video game comprises an on-line game in which a plurality of players operate respective characters in a common virtual space by utilizing a computer network.

* * * * *